(12) United States Patent
Gallegos, III et al.

(10) Patent No.: US 9,568,697 B2
(45) Date of Patent: Feb. 14, 2017

(54) DEMARCATION DEVICE

(71) Applicant: Hewlett-Packard Development Company, L.P., Houston, TX (US)

(72) Inventors: David G. Gallegos, III, Houston, TX (US); Karl J. Dobler, Houston, TX (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 220 days.

(21) Appl. No.: 14/153,303

(22) Filed: Jan. 13, 2014

(65) Prior Publication Data
US 2015/0201516 A1 Jul. 16, 2015

(51) Int. Cl.
*G02B 6/44* (2006.01)
*H02G 3/04* (2006.01)

(52) U.S. Cl.
CPC .......... *G02B 6/4452* (2013.01); *H02G 3/0443* (2013.01); *G02B 6/4459* (2013.01); *Y10T 29/49174* (2015.01); *Y10T 29/49826* (2015.01)

(58) Field of Classification Search
CPC ........................... G02B 6/4459; H02G 3/0443
See application file for complete search history.

(56) References Cited

U.S. PATENT DOCUMENTS

| | | | |
|---|---|---|---|
| 4,596,095 A | 6/1986 | Chalfant | |
| 5,548,932 A | 8/1996 | Mead | |
| 6,427,400 B1 | 8/2002 | Greenblatt | |
| 7,770,344 B2 | 8/2010 | Betz | |
| 7,954,776 B2 | 6/2011 | Davis et al. | |
| 7,959,019 B2 | 6/2011 | Jette | |
| 8,106,311 B2 * | 1/2012 | Larsen | H02G 3/0443 174/101 |
| 8,520,996 B2 | 8/2013 | Cowen et al. | |
| 8,559,783 B2 | 10/2013 | Campos et al. | |
| 2006/0038091 A1 | 2/2006 | Winn et al. | |

* cited by examiner

*Primary Examiner* — John M Bedtelyon
(74) *Attorney, Agent, or Firm* — Hewlett Packard Enterprise Patent Department

(57) ABSTRACT

A demarcation device is disclosed. The demarcation device mounts on top of a cable tray. When mounted on the to of a cable tray the demarcation device is above a length of the cable tray and the bottom edge of the demarcation device is parallel with a top edge of the cable tray and a cable path in the cable tray remains un-obstructed.

10 Claims, 6 Drawing Sheets

DEMARCATION DEVICE

BACKGROUND

Data centers are becoming denser. The number of devices in each data center is also increasing. Each device in the data center may be connected to the Internet. The connection is typically through either an optical cable or a wired cable.

DETAILED DESCRIPTION

Figure 1:
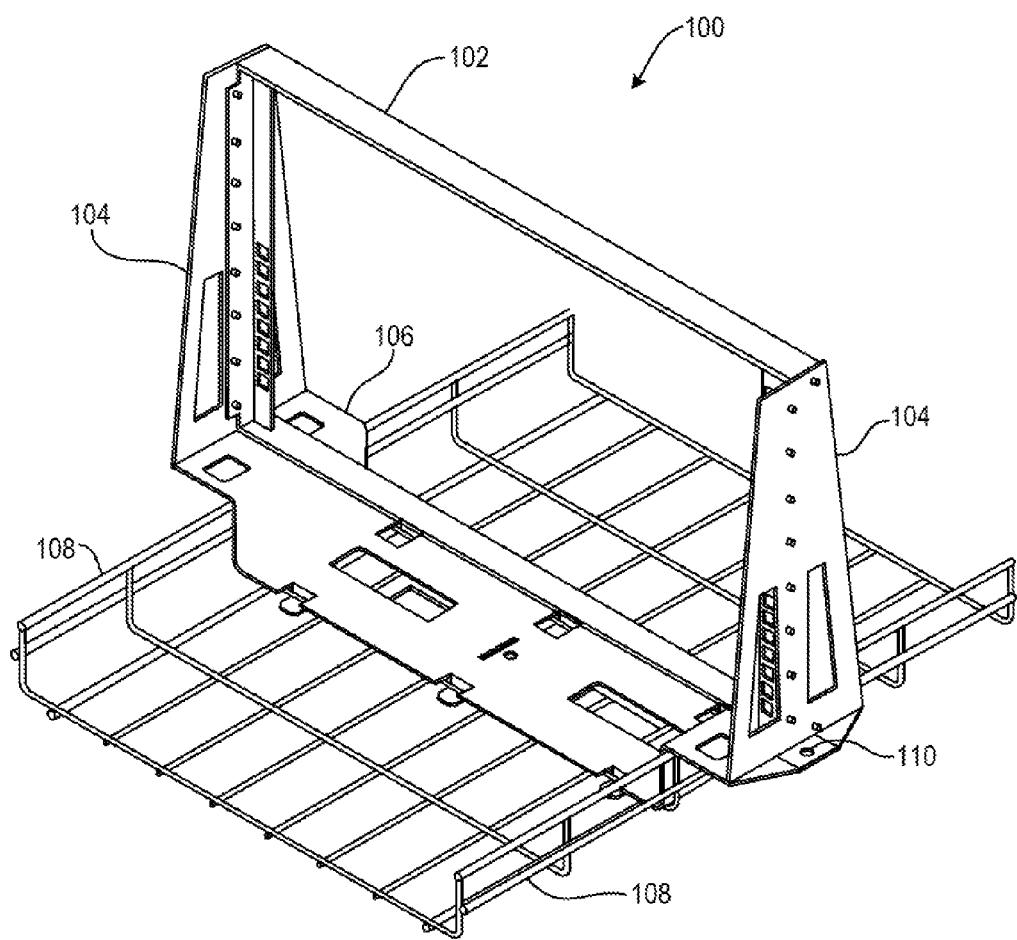
FIG. 1 is an isometric view of an example demarcation device 100 mounted on a cable tray.

As data centers become denser the management of cables becomes more difficult. Each device in the data center is typically coupled to a device on the outside of the data center with a cable. The devices inside the data centers are typically mounted in racks. Racks are frames or enclosures with openings for devices that have a standard size, typically 19 inches wide. The height of the openings for the devices is also standardized as multiples of 1.75 inches (44.45 min) or one rack unit or U. The industry standard rack cabinet is 42 U tall. A cable entering the data center would be routed to one of the racks and each strand or sub-strand in the cable would be connected to a device in the rack.

Unfortunately all of the devices that the cable is to be connected to may not be located in the same rack. To complete the connection to the proper rack/device, the strand or sub-strand from the original cable would be coupled to a device in the first rack, typically a patch panel, and a second cable would be used to connect the device in the first rack to the final device in a second rack. This creates a number of challenges. The first challenge is that when a patch panel is used to transfer the connection from the first cable to the second cable, the patch panel takes up space in the rack that could be used for other types of devices, for example a server or a storage device.

The second challenge created is the increase in complexity and density of the cabling. For each strand or sub-strand that is routed to a rack that is not its final destination, two extra cables are routed to that rack. The first extra cable is the one coining in from outside the data center. A cable coining in from outside the data center will be called an external cable. The second extra cable is run from the first rack to the final destination at the second rack. A cable running between two devices inside the data center will be called an internal cable.

Typically the cables are routed through the data center in cable trays. A cable tray is a long tray with a bottom that supports the cables and two sides that keep the cables within the tray. Some cable trays have a top that encloses the cables in the tray. Cable trays come in a number of different types. Some cable trays have solid bottoms and/or sides. Other cable trays are made from wire and have openings along the bottom and sides. Another type of cable trays are called ladder trays because they have evenly spaced supports extending between two side rails (making them look like ladders). Cable trays come in a variety of different widths and depths. For example 6, 8, 12, 16, 18 and 24 inches wide and 2 or 4 inches deep.

Typically the cable trays are run under the floor of a data center, along the ceiling of a data center or in both locations. When the cable trays are run along the ceiling, they can be suspended or hung from the ceiling or attached to the walls. The cable trays typically have some clearance between the top of the cable tray and the bottom of the ceiling. This allows access into the trays to route the cables. The clearance between the top of the cable tray and the bottom of the ceiling varies but can range between 12 inches and 3 to 4 feet, depending on the distance between the data center floor and its ceiling and the size of the racks used.

In one example of the invention, the area above the cable trays will be used to terminate the external cables coming into the data center. A network device will be mounted in a demarcation device positioned on top of the cable tray. The incoming external cables will be terminated into the front side of the network device. Internal cables will couple to the back side of the network device and run along the cable tray to their final destination inside the data center.

FIG. 1 is an isometric view of an example demarcation device 100 mounted on a cable tray. Demarcation device 100 comprises a frame assembly and a base 106. The frame assembly comprises a frame 102 and two side supports 104. The frame 102 is fabricated from metal or plastic and forms a rectangular opening. The width of the opening is the standard rack width. The height of the opening is a multiple of the standard rack height. In this example the height of the opening is 6 U. A series of mounting holes are located along both sides of the frame 102 allowing rack mountable devices to be attached to the frame.

In this example the two side supports 104 are separate pieces with one attached to each side of the frame. The side supports may also be fabricated from metal or plastic and may be attached to the frame by ally suitable means, for example rivets, screws, glue or the like. The side supports couple with the base 106 and help support the frame and keep it perpendicular to the cable tray. The base 106 is shown attached to a wire cable tray 108. In other examples the side supports may not be separate parts but may be integrated as part of the frame.

As shown, when the base is attached to the cable tray the frame is positioned on top of the cable tray and is perpendicular to the length of the cable tray. The bottom edge of the flame is parallel with the top edge of the cable tray leaving the tray unobstructed so cables can run underneath the frame.

In this example the frame assembly is removably attached to the base 106. In other examples the frame assembly and base 106 may be integrated into one unit. The bottom edge of the frame is parallel with, and resting on, the top edge of the cable tray when the frame assembly is attached to the base 106. This allows cables to pass underneath the frame when the cables are installed in the cable tray 108.

Figure 2:
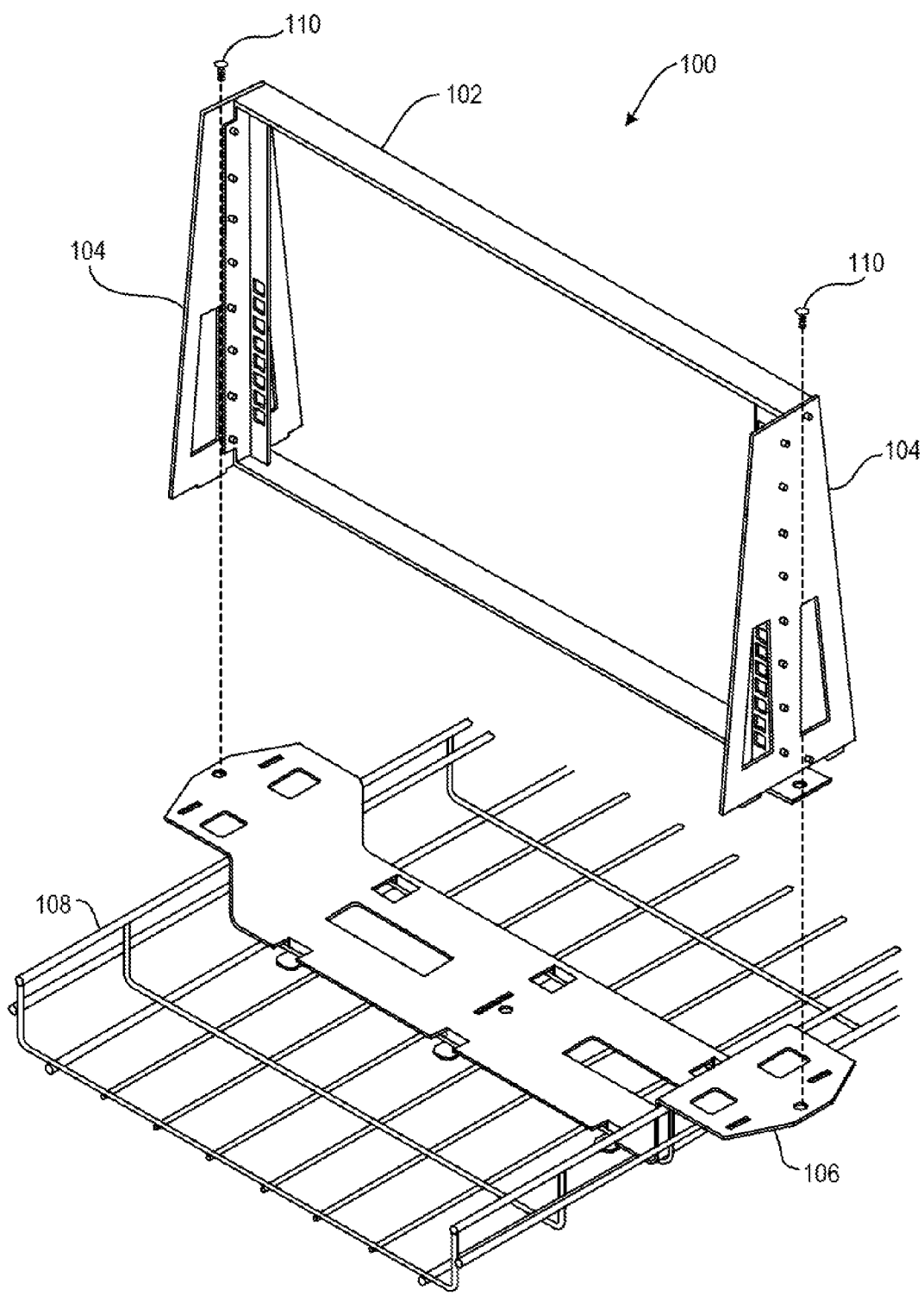
FIG. 2 is an isometric view of an example frame assembly detached from the base 106.

FIG. 2 is an isometric view of an example frame assembly detached from the base 106. The base 106 is shown attached to a wire cable tray 108. In other examples the base may be attached to a different type of cable tray. The frame assembly is attached to the base using any suitable attachment means, in this example two screws 110 are used, one on each side of the frame assembly. In one example tabs along the bottom edge of the side supports 104 fit into slots formed in base 106. The tabs help align the frame assembly with the base 106 and prevents the frame assembly from moving relative to the base 106 after assembly.

Figure 3A:
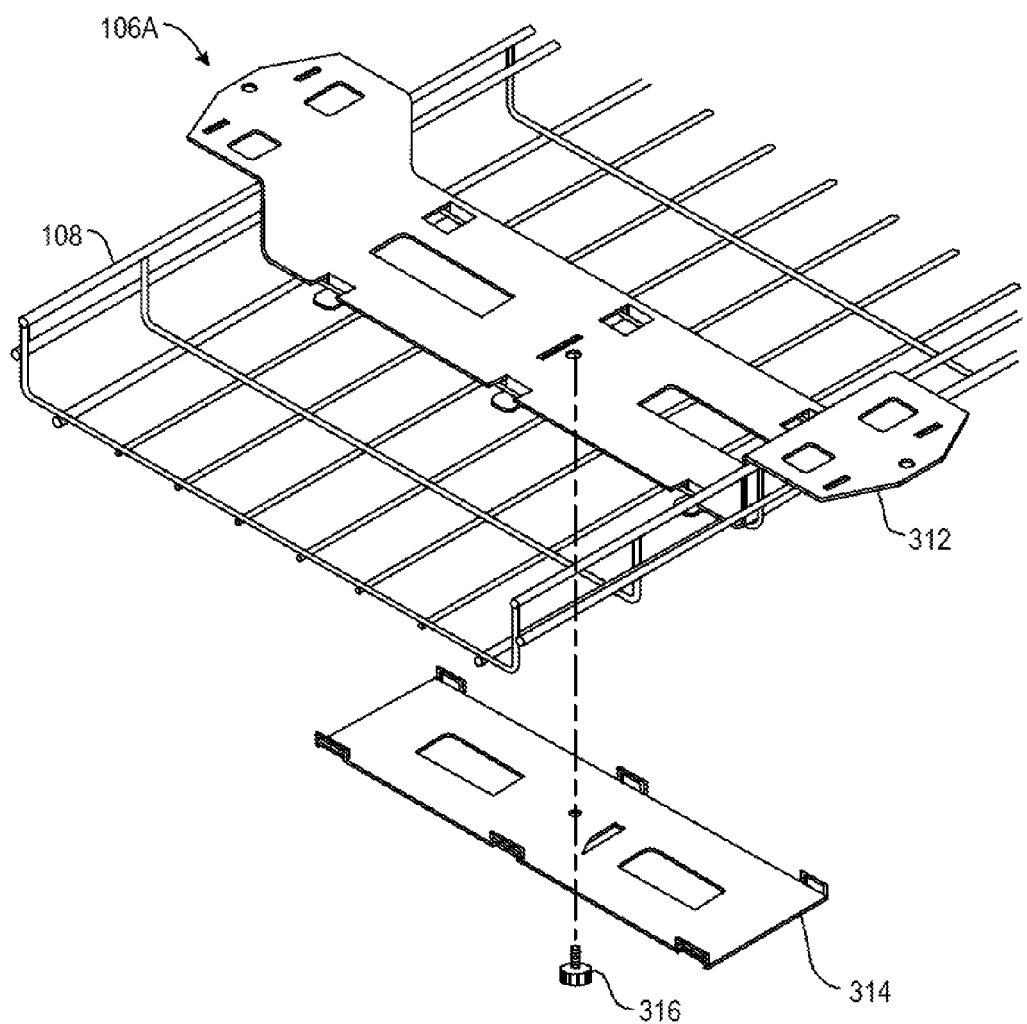
FIG. 3A is an isometric view of an example base 106A.

FIG. 3A is an isometric view of an example base 106A. In this example, base 106A is a two piece clam shell type design with an upper brace 312 and a lower locking unit 314. The upper brace 312 is designed to fit inside the cable tray 108 flush with the bottom floor and sides of the cable tray 108. The lower locking unit 314 fits against the bottom side of the cable tray and attaches to the upper brace 312 with a thumb screw 316 thereby clamping the wires forming the bottom of the cable tray between the upper brace 312 and the lower locking unit 314. The base described in this example is designed for a wire cable tray.

Figure 3B:
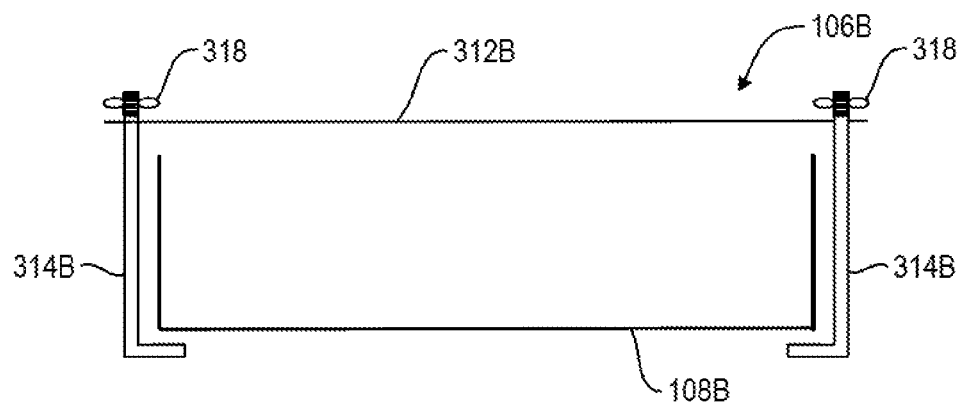
FIG. 3B is a front view of another example base 106B.

The base may be different for different types of cable trays. FIG. 3B is a front view of another example base 106B. Base 106B can be used with as solid cable tray, a ladder cable tray, a wire cable tray and the like. Base 106B comprises a top brace 312B and two clamps 314B. The top brace rests on top of the cable tray 108B. The two clamps 314B have threaded ends that fit through openings on each side of the top brace 312B. A wing nut 318 mates with the threaded end to pull the clamp upward. The lower ends of the clamps 314B are bent to capture the bottom edge of the cable tray as the wing nuts 318 are turned, thereby clamping the top brace to the cable tray 108B. In other example the base may attach to the sides of a cable tray. Some cable trays have top covers. In some examples the base may attach to the cable tray using the attachment points for the top cover.

Figure 4:
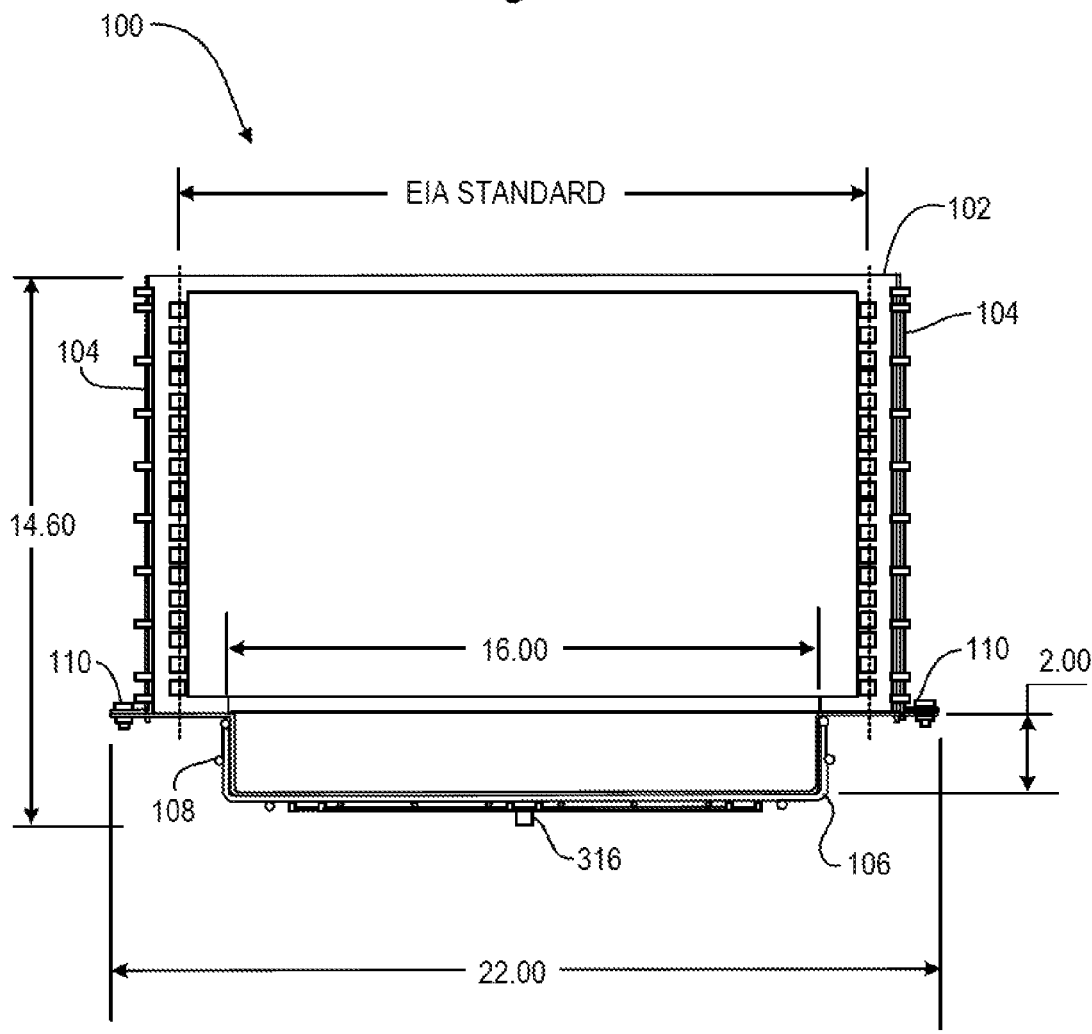
FIG. 4 is a front view of an example demarcation device 100.

FIG. 4 is a front view of an example demarcation device 100. The mounting holes running down both sides of the frame 102 are spaced apart with the Electronic Industries Alliance (EIA) Standard distance for racks, resulting in a total width of 22 inches. In this example, the base 106 is designed for a standard 16 inch wide by 2 inch deep wire cable tray 108. The frame is designed with a 6 U height, giving the demarcation device 100 a total height of 14.6 inches.

Figure 5:
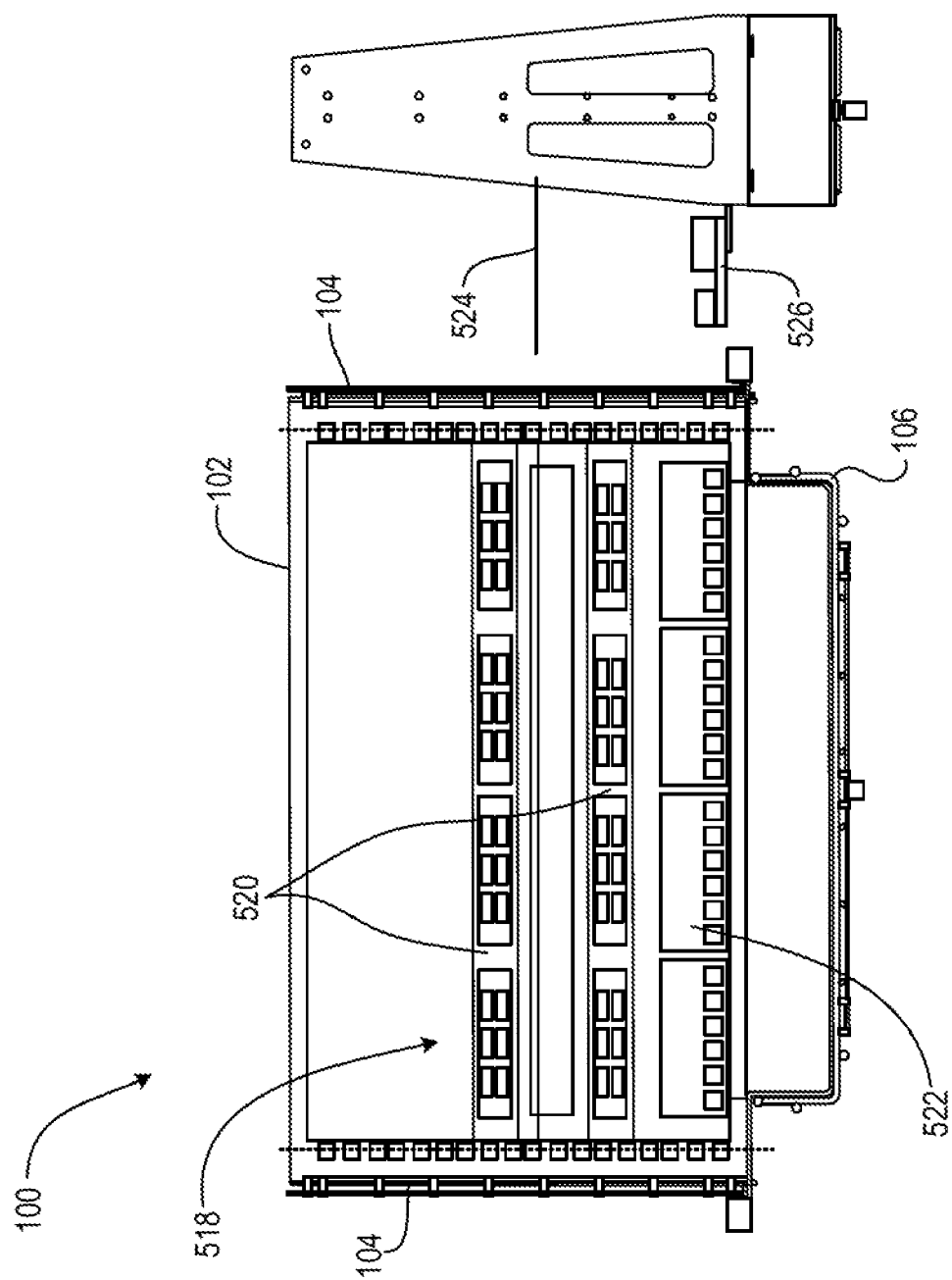
FIG. 5A is a front view of an example demarcation device with a patch panel 518 mounted into the frame 102.
FIG. 5B is a side view of the example demarcation device from FIG. 5A.

In some examples the network device mounted into the demarcation device is a patch panel. The patch panel may be for optical connections, wired connections, or a combination of optical and wired connections. FIG. 5A is a front view of an example demarcation device with a patch panel 518 mounted into the frame 102. Patch panel 518 has two sets of Multiple-Fiber Push-On/Pull-off (MTP/MPO) pass flint connectors 520 and one set of Cat6 connectors 522. FIG. 5B is a side view of the example demarcation device from FIG. 5A. Patch panel 518 has a hanger 524 to support the incoming cables and a strain relief saddle 526 mounted to the front side. The patch panel shown includes a strain relief. Other patch panels may not include a strain relief. In other examples the network device may not be separate from the frame in the demarcation device, but may be integrated with the frame and mount directly to the base.

Figure 6:
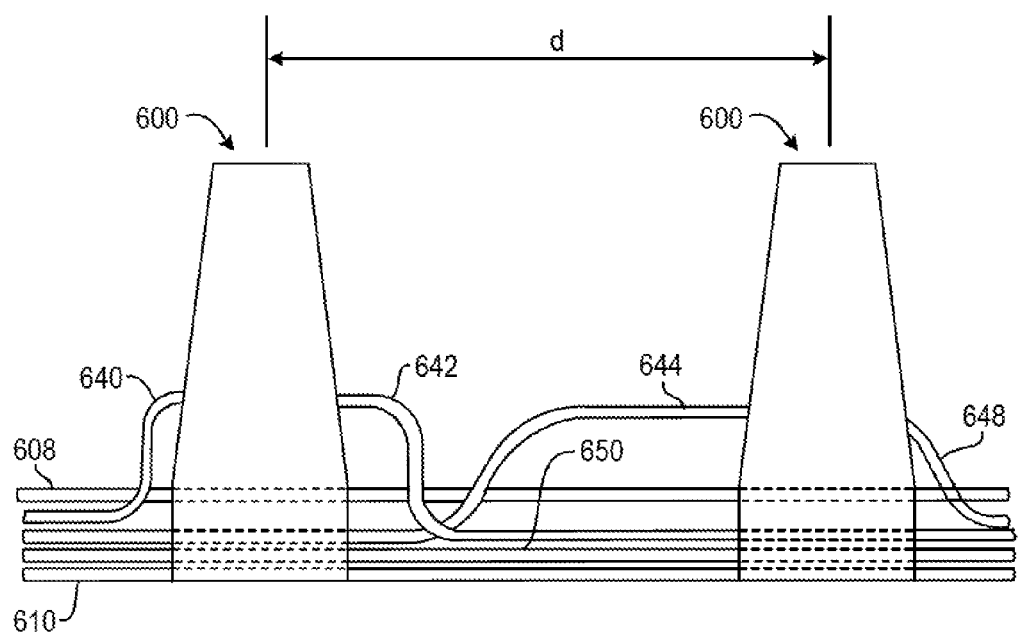
FIG. 6 is a side view of two example demarcation device 600 in use.

FIG. 6 is a side view of two example demarcation device 600 in use. The two demarcation devices 600 are mounted on top of a cable tray 608 separated by distance d. The left most demarcation device 600 will be referred to as the first demarcation device 600 and the right most demarcation device 600 will be referred to as the second demarcation device 600. The distance d between the two demarcation devices 600 depends on the size of the devices mounted into the two demarcation devices 600. A cable or wire entering the data center will be known as an external cable. A cable or wire connecting one device inside the data center to another device inside the data center will be known as an internal cable. A number of external cables (640, 611 and 650) enter the data center from the left edge of the figure and are located in the cable tray 608.

One external cable 640 is terminated into the from (left) side of a device mounted in the first demarcation device 600. A first internal cable 642 is connected to the back (right) side of the device mounted in the first demarcation device 600, and runs along the cable tray underneath the second demarcation device 600 to its final destination inside the data center. A second external cable 644 runs underneath the first demarcation device 600 and is connected to the from (left) side of the device mounted in the second demarcation device 600. A second internal cable 648 is connected to the back (right) side of the device mounted in the second demarcation device 600, and runs along the cable tray to its final destination inside the data center. One external cable 650 runs underneath both demarcation devices 600 and is not terminated until it reaches a rack.

What is claimed is:
1. A demarcation device, comprising:
    a base having an upper surface and a lower surface, the base to mount to a cable tray;
    a frame attached to the upper surface of the base, the frame having a top edge, a bottom edge above the upper surface of the base, and two side edges, the frame forming a rectangular opening between the four edges, the frame forming a plurality of mounting holes along the two side edges; and
    a cable path below the bottom edge of the frame and above the lower surface of the base;
        when the base is mounted to the cable tray, the frame is above a length of the cable tray, the bottom edge of the frame is substantially parallel with a top edge of the cable tray, and the cable path remains unobstructed.
2. The demarcation device of claim 1, wherein the rectangular opening has an Electronic Industries Alliance (EIA) standard rack width and has a height that is a multiple of a standard rack height U.
3. The demarcation device of claim 1, wherein the base is to mount to one of the following types of cable trays: a wire cable tray, a ladder cable tray, a solid cable tray.
4. The demarcation device of claim 1, wherein the base is to mount to a cable tray having one of the following widths: 6, 8, 12, 16, 18, and 24 inches wide.
5. The demarcation device of claim 1, wherein a patch panel is mounted in the rectangular opening.
6. The demarcation device of claim 1, wherein the frame is substantially perpendicular to the length of the cable tray when the base is attached to the cable tray.
7. The demarcation device of claim 1, the base further comprising:
    an upper brace with the upper surface and the lower surface; and
    a lower locking unit forming a clam shell design;
        the upper brace to fit inside the cable tray flush with a bottom floor of the cable tray;
        the lower locking unit to fit against a bottom side of the cable tray and to be attached to the upper brace with a screw thereby clamping the bottom of the cable tray between the upper brace and the lower locking unit.
8. A demarcation device, comprising:
    a base having a surface, the surface to mount to a bottom portion of a cable tray;

a patch panel having a plurality of input sockets on a front side and a plurality of output sockets on a back side, the patch panel mounted to the base; and a cable path below the patch panel and above the surface of the base;

when the base is mounted to the cable tray, the patch panel is above a length of the cable tray, a bottom edge of the patch panel is substantially parallel with a top edge of the cable tray, and the cable path remains un-obstructed.

9. The demarcation device of claim 8 further comprising:
a frame attached to the base, the frame having a top edge, a bottom edge, and two side edges, the frame forming a rectangular opening between the four edges, the frame forming a plurality of mounting holes along the two side edges and where the patch panel is mounted to the rectangular opening.

10. The demarcation device of claim 9, wherein the rectangular opening has an Electronic Industries Alliance (EIA) standard rack width and has a height that is a multiple of a standard rack height U.

\* \* \* \* \*